United States Patent
Faulkner et al.

(10) Patent No.: US 10,571,271 B2
(45) Date of Patent: *Feb. 25, 2020

(54) INERTIAL NAVIGATION SYSTEM

(71) Applicant: Atlantic Inertial Systems Limited, Plymouth, Devon (GB)

(72) Inventors: Nicholas Mark Faulkner, Plymouth (GB); John Keith Sheard, Plymouth (GB)

(73) Assignee: ATLANTIC INERTIAL SYSTEMS LIMITED, Plymouth, Devon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/964,147

(22) Filed: Apr. 27, 2018

(65) Prior Publication Data
US 2018/0340779 A1  Nov. 29, 2018

(30) Foreign Application Priority Data
May 23, 2017 (GB) .................................. 1708265.2

(51) Int. Cl.
| G01C 21/18 | (2006.01) |
| G01C 25/00 | (2006.01) |
| F42B 15/01 | (2006.01) |

(52) U.S. Cl.
CPC .............. G01C 21/18 (2013.01); F42B 15/01 (2013.01); G01C 25/005 (2013.01)

(58) Field of Classification Search
CPC ...... G01C 21/16; G01C 21/18; G01C 25/005; G01C 21/165; G05D 1/108; F41G 7/36;
(Continued)

(56) References Cited

U.S. PATENT DOCUMENTS 5,788,180 A * 8/1998 Sallee .................... F41G 7/222
244/3.15
8,047,070 B2  11/2011 Tyree
(Continued)

FOREIGN PATENT DOCUMENTS

| GB | 2526508 A | 12/2015 |
| GB | 2534833 A | 8/2016 |
| WO | 9934231 A2 | 7/1999 |

OTHER PUBLICATIONS

Jiawei et al., Roll estimation algorithm based on Sage-Husa adaptive Kalman filtering with rotation criteria, 2017, IEEE, p. 155—(Year: 2017).*
Kuhn, Aspects of pure and satellite-aided inertial navigation for gun-launched munitions, 2004, IEEE, p. 327-336 (Year: 2004).*
Chen et al., Attitude determination for MAVs using a Kalman filter, 2008, IEEE, p. 1-5 (Year: 2008).*
(Continued)

*Primary Examiner* — Mcdieunel Marc
(74) *Attorney, Agent, or Firm* — Cantor Colburn LLP

(57) ABSTRACT

An inertial measurement system comprising: a first, roll gyro with an axis oriented substantially parallel to the spin axis of the projectile; a second gyro and a third gyro with axes arranged with respect to the roll gyro; a controller, arranged to: compute a current projectile attitude from the outputs of the first, second and third gyros; operate a Kalman filter that receives a plurality of measurement inputs including at least roll angle, pitch angle and yaw angle and that outputs at least a roll angle error; initialise the Kalman filter with a roll angle error uncertainty representative of a substantially unknown roll angle; generate at least one pseudo-measurement from stored expected flight data; provide said pseudo-measurement(s) to the corresponding measurement input of the Kalman filter; and apply the roll angle error from the Kalman filter as a correction to the roll angle.

15 Claims, 4 Drawing Sheets

(58) Field of Classification Search
CPC ......... F41G 7/305; G42B 15/01; G01S 19/48; G01S 19/54; G01S 19/49
See application file for complete search history.

(56) References Cited

U.S. PATENT DOCUMENTS

| | | | |
|---|---|---|---|
| 2007/0265810 A1 | 11/2007 | Martin et al. | |
| 2012/0043410 A1 | 2/2012 | Geswender et al. | |
| 2012/0223180 A1* | 9/2012 | Axford | F42B 10/12 244/3.21 |
| 2012/0256038 A1* | 10/2012 | Elwell, Jr. | F42B 12/22 244/3.2 |
| 2017/0016728 A1* | 1/2017 | Sheard | G01C 19/025 |
| 2017/0160306 A1* | 6/2017 | Sheard | F42B 15/01 |
| 2017/0322030 A1* | 11/2017 | Sheard | G01C 21/16 |
| 2017/0363428 A1* | 12/2017 | Faulkner | G01C 21/165 |

OTHER PUBLICATIONS

Wang et al., Constrained Filtering Method for MAV Attitude Determination, 2005, IEEE, p. 1480-1483 (Year: 2006).*
L.D. Fairfax and F.E. Fresconi "Position Estimation for Projectiles Using Low-cost Sensors and Flight Dynamics" (DTIC ADA560811), Apr. 2012, 38 pages.
J.S. Bird in "Inertial Sensor Performance Requirements for a Long Range Artillery Rocket" (DTIC ADA279936), Apr. 1993, 21 pages.
M.J. Wilson, "Attitude Determination with Magnetometers for un-Launched Munitions", DTIC ADA42599, Aug. 2004, 23 pages.
T.E. Harkins, "On the Viability of Magnetometer-Based Projectile Orientation Measurements", DTIC ADA474475, Nov. 2007, 35 pages.
Intellectual Property Office Search Report for International Application No. GB1708265.2 dated Nov. 9, 2017, 3 pages.

* cited by examiner

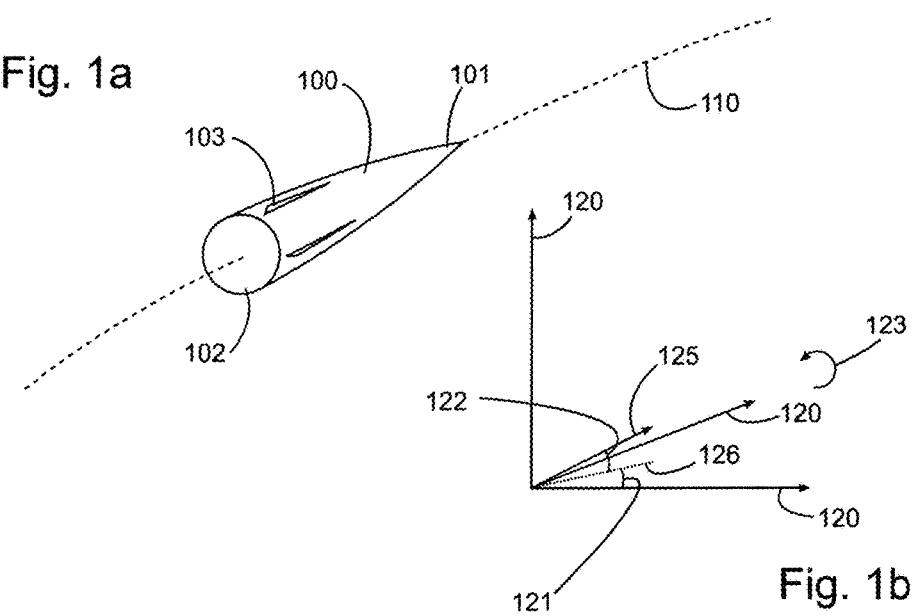
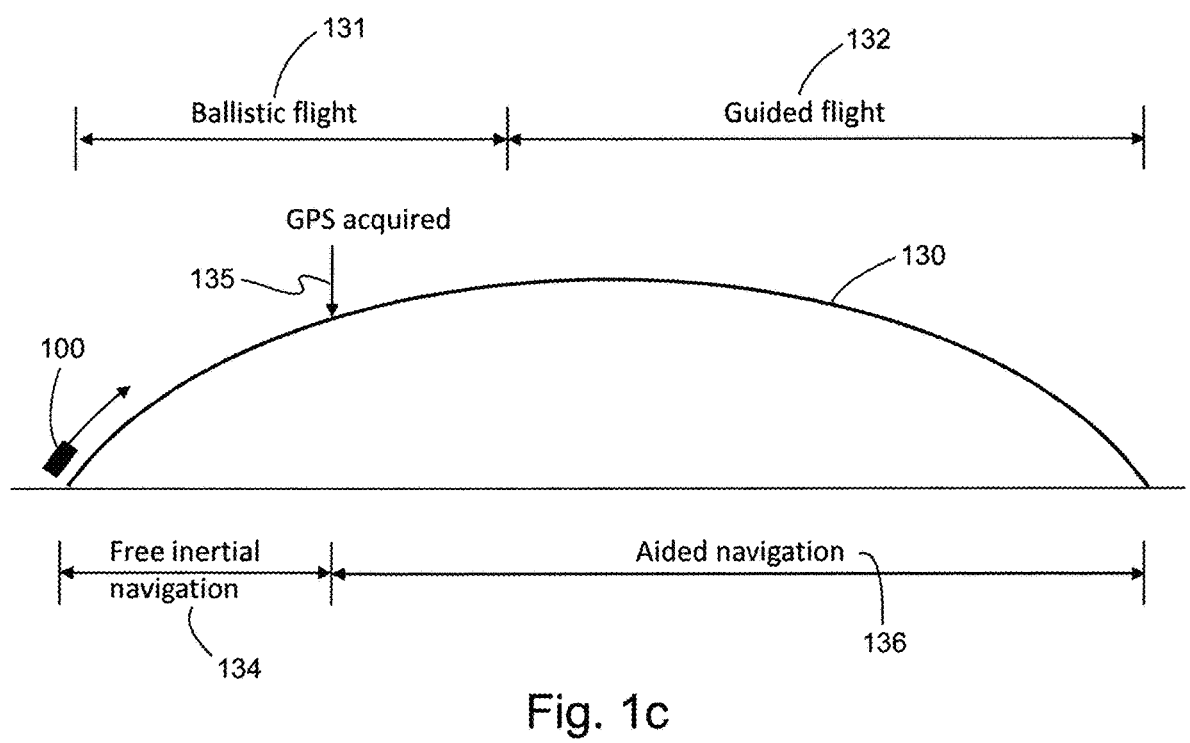

INERTIAL NAVIGATION SYSTEM

FOREIGN PRIORITY

This application claims priority to Great Britain Patent Application No. 1708265.2 filed May 23, 2017, the entire contents of which is incorporated herein by reference.

TECHNICAL FIELD

This disclosure relates to inertial navigation systems, in particular those used for spinning guided projectiles. Inertial navigation systems can be used on guided projectiles to provide position information which can in turn be used to correct the projectile's course to keep it on target.

BACKGROUND

Navigation systems can use a variety of different sensors to detect changes to the motion and orientation of an object. For example accelerometers, gyros and magnetometers are often used as are photodiodes. Accelerometers detect applied force, gyros detect rotation rates and magnetometers detect the Earth's magnetic field and photodiodes can be used to detect the sun. Thus magnetometers and/or photodiodes can be used to determine absolute orientation.

Inertial navigation systems, based on accelerometers and gyroscopes, can be used either on their own or together with other navigation systems such as GPS. Navigation/guidance of rockets and other munitions is often based on the use of micro-electro-mechanical (MEMS) sensors due to their small size and low-cost. The accuracy of these sensors is relatively poor and not sufficient to meet typical navigation requirements unless external sensors are used to estimate and correct the inertial sensor errors. Using additional aiding sensors in this way is the basis of what is known as 'integrated navigation'.

Integrated navigation is usually based on an algorithmic technique known as Kalman Filtering, a process which blends data from the inertial sensors and external aiding sensors in an optimal way. For this technique to operate robustly, it has traditionally been understood that navigation errors must be maintained within certain limits at all times, else the linearity assumptions on which the Kalman filter is founded will not be valid and the integrated navigation solution may become grossly inaccurate. It is normally desired to avoid this situation by constraining navigation error growth during projectile flight.

When considering navigation Kalman filtering for applications involving rockets, missiles and other rotating platforms, initialising and maintaining an accurate roll (bank) angle presents the biggest challenge. An analysis of the problems associated with the use of inertial guidance technology in such applications is provided by J. S. Bird in "Inertial Sensor Performance Requirements for a Long Range Artillery Rocket" (DTIC ADA279936), with the conclusion that the roll gyro scale factor accuracy is critical and needs to be less than 5 parts-per-million (ppm).

Unfortunately, inexpensive low grade MEMS gyroscopes have a scale factor error of several thousand ppm. Using a gyroscope with a scale factor accuracy of less than 5 ppm would not be practical in terms of cost. Therefore there is a need for a system that can achieve the desired accuracy using inexpensive sensors with much lower scale factor accuracy.

The errors in gyroscope sensors are broadly divided into bias errors and scale factor errors. Although these and other errors are measured and removed as part of a factory calibration process, there will always be residual errors present when the sensors are actually used. These arise for a variety of reasons such as temperature and humidity changes, as well as other physical stresses affecting the unit. In general these errors may be different each time the unit is switched on.

As discussed in the above-referenced paper by J. S. Bird, in strapdown inertial navigation systems (i.e. those in which the inertial sensors are fixed to the body of the airframe as opposed to those in which the sensors are mounted on a gimballed platform that is free to rotate and so remain level at all times), one of the biggest problems comes from high roll rates. Typically roll rates for ballistic projectiles may be of the order of 10-20 full rotations per second, i.e. rotation rates of the order of a few thousand degrees per second. Therefore with a typical roll rate scale factor error of 1000 ppm, the roll angle (bank angle) calculated from this gyro would accumulate an error of a few degrees per second. For a typical projectile range of 30 to 60 km and a typical flight time of 1 to 2 minutes, this error quickly mounts up to be unacceptable.

Gyro bias error can readily be compensated immediately prior to use by averaging a series of readings while the gyro is known to be in a non-rotating state, e.g. prior to launch in the case of a projectile such as a rocket or missile. However, the scale factor error is rate-dependent and may not be measured and corrected whilst stationary. This suggests the need for a scale factor error correction process which operates in-flight, in a wholly self-contained fashion.

Alternative techniques which have been used in attempts to maintain roll accuracy include the use of non-inertial sensor aiding such as magnetometer, light sensor, GPS and/or thermopiles. These approaches add complexity and cost and introduce additional performance constraints. See for example "Attitude Determination with Magnetometers for un-Launched Munitions", M. J. Wilson, DTIC ADA425992; and "On the Viability of Magnetometer-Based Projectile Orientation Measurements", T. E. Harkins, DTIC ADA474475.

"Position Estimation for Projectiles Using Low-cost Sensors and Flight Dynamics" by L. D. Fairfax and F. E. Fresconi (DTIC ADA560811) describes another solution to this problem for gun-launched mortars which relies upon a multi-state Extended Kalman Filter to estimate position and velocity, but roll angle is determined via additional attitude aiding. This technique is applied to an application with a more benign roll rate profile than a typical artillery rocket.

U.S. Pat. No. 8,047,070 describes a process for estimating the roll angle of a gun-launched projectile. U.S. Pat. No. 8,047,070 uses body angular rate data as its measurements, as opposed to derived Euler angles. It also does not estimate or correct the roll rate scale factor error and it does not operate to preserve elevation and heading accuracy.

GPS-aided systems are frequently deployed in munitions applications and a navigation Kalman filter normally features in the guidance/control solution. Most applications involve a period of ballistic or near-ballistic flight, and this environment has some unique characteristics which affect the observability of some key Kalman filter error states. As discussed above, the use of low-cost MEMS sensors means that navigation errors develop rapidly in the absence of GPS aiding, and the process of navigation initialisation is often complicated by the fact that it must be carried out in flight, on a spinning platform where the roll angle is completely unknown or known only with very poor accuracy.

Broadly speaking, guided munitions can be divided into two different types, guided rockets and artillery/mortars.

Earlier techniques developed by the present applicant were concerned with minimising the Kalman filter error growth in guided rocket applications. In guided rocket applications, integrated navigation is generally initialised on the ground, while the projectile is still in the launch tube. The navigation equipment is powered up and the mission planning computer is able to transfer a full vector of data that accurately initialises all of the navigation variables. Integrated navigation continues uninterrupted from pre-launch, through the launch event and into the flight phase. The main difficulty with these applications is that significant spinning motion is often present, and the low-cost MEMS gyro measuring the spin motion generally has a sufficiently large scale factor error that all knowledge of platform roll angle is lost by the time GPS aiding is available, usually some 10-15 seconds into the flight. This problem led to earlier development of techniques such as those described in United Kingdom patent publication no. 2526508, United Kingdom patent publication no. 2534833, and United Kingdom patent application no. 1610747.6 for constraining roll angle error growth during the early flight phase, the aim being to maintain attitude errors within certain limits that would allow the navigation Kalman filter to correct the solution and achieve orderly convergence once GPS was acquired.

Mortar and artillery applications have different requirements from guided rockets. On these platforms the navigation equipment may be pre-programmed with parameters such as launch position, launch velocity and initial heading and elevation angles, after which the equipment will normally remain powered-off until shortly after launch. Trajectories will usually involve spinning motion, and even if the roll angle is known prior to launch (which is not normally the case), it will be completely unknown at the point of power on. Whilst all the other navigation variables may be known with acceptable accuracy at this time, the unknown roll angle will usually preclude initialisation of the integrated navigation function.

The conventional solution to this problem is to deploy a bespoke 'upfinding' function that runs prior to navigation initialisation. Using data from inertial sensors, or from other sensors such as magnetometers or photodiodes, a conventional upfinder produces an initial estimate of roll angle and this is used to start the integrated navigation process. The upfinding function is sometimes described as 'coarse alignment', and this function is invariably implemented as a standalone process, external to the navigation Kalman filter. Once coarse alignment is complete, the roll angle estimate is used to initialise integrated navigation and the system transitions to a 'fine alignment' mode. However, as described above, such 'upfinding' processes and associated additional sensors add cost and complexity to the system.

SUMMARY

According to this disclosure there is provided an inertial measurement system for a spinning projectile comprising a first, roll gyro with an axis oriented substantially parallel to the spin axis of the projectile and a second gyro and a third gyro with axes arranged with respect to the roll gyro such that they define a three dimensional coordinate system. The system also includes a controller, arranged to: compute a current projectile attitude from the outputs of the first, second and third gyros, the computed attitude comprising a roll angle, a pitch angle and a yaw angle; operate a Kalman filter that receives a plurality of measurement inputs including at least the roll angle, pitch angle and yaw angle and that outputs at least a roll angle error; initialise the Kalman filter with a roll angle error uncertainty representative of a substantially unknown roll angle; generate at least one pseudo-measurement from stored expected flight data, the or each pseudo-measurement corresponding to an expected measurement input of the Kalman filter; provide said pseudo-measurement(s) to the corresponding measurement input of the Kalman filter; and apply the roll angle error from the Kalman filter as a correction to the roll angle; wherein the Kalman filter is arranged to calculate the roll angle error as a function of the pseudo-measurement(s).

This process allows a different approach to integrated navigation to be used. With this approach, integrated navigation is initialised immediately after power-up, even though the roll angle is unknown or only known to a very coarse degree. The navigation Kalman filter configured with this pseudo-measurement update process allows reliable and rapid convergence to an accurate navigation solution without the need for a discrete upfinding process as it is not reliant on any knowledge of the initial roll angle. Instead, the Kalman filter can be initialised with an arbitrary roll angle, while the roll angle uncertainty is initialised to indicate that that the roll angle is either completely unknown or known to a low degree of accuracy (compared with the normal Kalman filter uncertainty initialisation which would typically indicate that the roll angle is known to within about 5 or 10 degrees). This approach has numerous benefits, both in terms of pure performance and ease of implementation. The implementation without a separate upfinding process reduces software complexity and avoids the delay associated with a separate upfinding function and thus leads to more rapid estimation of an accurate roll angle. The Kalman filter can be initialised immediately after launch rather than having to wait for the upfinding to complete.

Initialising the Kalman filter with a completely unknown roll angle or only a coarsely known roll angle is contrary to conventional Kalman filter practice as it would appear to violate the linearity assumptions on which the filter theory is founded. However, it has been found that initialising the filter in this way does not hinder convergence and that performance remains orderly and robust. By applying the pseudo-measurements according to the values that they are expected to take according to the projectile's expected flight data (e.g. expected trajectory), the filter can still converge, correctly finding the roll angle of the projectile even though it was completely unknown at startup/launch. There are two contributing factors for why this works. Firstly, the ballistic flight environment is unique in terms of the small number of forces acting (gravity and the longitudinal drag force are the only significant ones) and in these circumstances, the precise way in which a roll angle error manifests itself means that a large error behaves more like a small error. In other words it has been found that the roll angle error is only weakly coupled to the other navigation states. Secondly, because the system uses pseudo-measurements rather than real measurements from a sensor such as a GPS receiver, the system is able to start updating the Kalman filter immediately after launch—there is no delay while waiting for a sensor to start operating. This means that, right from the beginning, the growth of errors in the system are constrained and thus the net error within the system is minimised. It has been found to be important that the overall error in the three Euler angles (roll, pitch, heading) is minimised. It is a given that the initial roll angle is unknown (or known only with coarse accuracy), but it is important that the heading and pitch angle errors remain small during the early convergence phase. Practically speaking, this requires that some sort of error constraint mechanism is activated shortly after launch. The pseudo-measurements provide such a mechanism.

This process exploits the fact that rolling projectiles such as guided munitions generally follow a predictable trajectory when not subject to controlled guidance. For example, they may travel on a fixed heading, or on a heading that varies in a predictable way as a function of flight time. Many such platforms employ low-cost, relatively low-performance MEMS gyros to maintain an attitude solution. Under rolling motion, significant roll angle errors will arise in the absence of any independent assistance from aiding sensors. The effect of this error can be explained in terms of the general characteristics of a ballistic trajectory, where, if viewed side-on, there is the familiar arcing motion as the pitch angle gradually reduces. For example, a projectile may start with a positive pitch angle, e.g. +45 degrees and end at a negative angle, e.g. −45 degrees. This pitching motion is measured by the on-board gyros, but when the measured angular rates are resolved into the navigation frame any error in the roll angle causes some of the pitching motion to appear in the wrong axes—one effect is that the estimated heading starts to drift off and become misaligned with the true heading. A second effect is that the estimated pitch angle profile (pitch angle as a function of flight time) deviates from the true pitch angle profile. The rate at which the heading and pitch angle errors develop is directly correlated with the roll angle error (and thus also with the roll gyro scale factor error). The Kalman filter develops quantitative knowledge of this relationship via the normal process of state uncertainty propagation, which itself relies on the analytic relationships between the navigation error states which are embodied within the state transition matrix. The roll angle error can thus be estimated if the heading and elevation angle errors (pitch and yaw angle errors) can be detected/observed, and the pseudo-measurements provide the means for achieving this.

Note that a secondary consequence of gradually increasing heading/pitch angle errors is that the drag force acting on the longitudinal axis of the projectile is mis-resolved into the navigation frame. This leads to cross-track and vertical velocity errors, an effect which presents an opportunity for alternative pseudo-measurement schemes to be deployed, such as those based on position and/or velocity for example.

The Kalman filter is preferably arranged to calculate the roll angle error as a function of the difference between the outputs of an inertial navigation system and the corresponding pseudo-measurement(s). For example in the case of Euler angle pseudo-measurements, the Kalman filter is preferably arranged to calculate the roll angle error as a function of the difference between the pitch angle and the pseudo-measurement of pitch angle and the difference between the yaw angle and the pseudo-measurement of yaw angle (the pitch angle and the yaw angle being outputs of the inertial navigation system, estimated from the gyroscope outputs). Similarly, in the case of position pseudo-measurements, the Kalman filter is preferably arranged to calculate the roll angle error as a function of the difference between the position components output from the inertial navigation system and the position component pseudo-measurements (the position components being outputs of the inertial navigation system, estimated from linear accelerometer and gyroscope outputs). Similarly, in the case of velocity pseudo-measurements, the Kalman filter is preferably arranged to calculate the roll angle error as a function of the difference between the velocity components output from the inertial navigation system and the velocity component pseudo-measurements (the velocity components being outputs of the inertial navigation system, estimated from linear accelerometer and gyroscope outputs).

The Euler angle pseudo-measurements provide direct observability of the elevation and heading angle errors and thus of the roll angle error. It has been found that supplying the Kalman filter with these pseudo-measurements provides a navigation solution with little or no tuning requirements and which converges rapidly, even starting from an unknown roll angle. For example, it has been found that the Kalman filter can estimate an unknown roll angle to within 5 degree accuracy within about 10 seconds in many cases. This is particularly convenient as it is broadly in line with typical GPS acquisition times, which means that the pseudo-measurement correction process and the GPS acquisition process can operate concurrently, after which the system can transition to conventional GPS/inertial integrated navigation. In addition, a complete solution is formed within the Kalman filter which leads to a much simpler and more efficient architecture (which is easier to maintain and extend).

As discussed above, the errors in the roll rate measurement are the most significant source of error in high roll rate navigation systems. Earlier systems have struggled to cope with the high roll rates that are present in the earliest phase of flight, i.e. immediately after launch, and attempts have been made to mitigate these effects. For example one option has been to employ an intermediate attitude reset function to reset the attitude at some point in time after the initial high roll rate has reduced to more manageable levels. Such an attitude reset function might for example use linear accelerometers to provide measurements of the current velocity and then trigger the reset based on the measured velocity. The system according to this disclosure does not require any such attitude reset and can instead be operated right from launch, providing good roll rate correction even during the high roll rate phase immediately after launch. However, if an attitude reset is desirable for some reason, the system according to this disclosure is also highly beneficial as the roll angle will be unknown immediately after the attitude reset and thus the system can regain that roll angle without requiring a separate upfinding process.

From the above discussions it will be understood that the system according to this disclosure can be used for a wide range of projectiles, including those which are powered on from launch and navigate throughout the launch process. Such projectiles may benefit by not requiring an initial roll angle to be set or detected before launch as it can be rapidly found automatically immediately after launch. However the system of this disclosure provides a particularly valuable improvement for projectiles such as mortars that are powered off at launch. Thus preferably the spinning projectile is arranged to be powered off at launch and to power up after launch. Such systems typically employ a battery that is triggered by the acceleration of the launch event and which powers up the on board electronics at that point. The electronics may take a few tenths of a second to come online, by which time, any prior knowledge of roll angle has been lost and therefore the problem of finding a completely unknown roll angle is of great importance and great benefit. In some preferred examples, the projectile is a mortar or artillery shell, such projectiles typically being powered off prior to launch as described here.

While the roll angle is completely unknown, it follows that the uncertainty in the roll angle is at a maximum, i.e. an uncertainty of 180 degrees (i.e. the actual value is within plus or minus 180 degrees from the current estimate). Therefore in general it will be preferred to set the roll angle uncertainty to the maximum. However, it will be appreciated that this is a statistical process and therefore acceptable results may be achievable for certain applications by setting the roll angle uncertainty to a lower value. For example, when the roll angle is completely unknown, setting the roll angle uncertainty to 90 degrees would mean that there is a 50% chance that the actual roll angle is within the range expected by the filter and a 50% chance that it is outside of that range (leading to potential instability and system failure through lack of convergence). Setting the uncertainty at a higher level improves the chances that the actual roll angle is within the expected range and thus decreases the chances that the system will fail. Thus, while setting the uncertainty to the maximum is optimal, it is not essential to achieve an acceptable rate of success for all applications. Therefore the roll angle uncertainty may be initialised as at least 90 degrees, preferably at least 135 degrees, more preferably at least 160 degrees, and most preferably 180 degrees, the latter being optimal.

In applications where the initial roll angle is completely unknown, it follows that the uncertainty in the roll angle is optimally at a maximum, i.e. an uncertainty of 180 degrees (i.e. the actual value is within plus or minus 180 degrees from the current estimate). In these situations it will be preferred to set the roll angle uncertainty to the maximum. However, there may be situations where the roll angle is not completely unknown but only a very coarse estimate is available. In these circumstances an initial roll angle uncertainty of, for example, 90 degrees may be appropriate. It is usually advantageous to use any knowledge of the initial roll angle, however coarse, and to set the initial uncertainty at a level that reflects this knowledge, as this will generally lead to more rapid and orderly filter convergence. Thus, while setting the uncertainty to the maximum will be required in many applications, it is not essential in all applications and an acceptable rate of success may be achieved with alternative settings. In the absence of any information about the initial roll angle, the optimum setting of the initial roll angle uncertainty will preferably be plus or minus 180 degrees. Where the roll angle is coarsely known, the roll angle uncertainty will preferably be set appropriately according to how well the roll angle is known. However, for the purposes of illustration, this will preferably be at least plus or minus 10 degrees, at least plus or minus 20 degrees, at least plus or minus 30 degrees, at least plus or minus 45 degrees at least plus or minus 90 degrees, or at least plus or minus 135 degrees.

The Kalman filter estimates various state parameters by combining current estimates with measurements (observations), e.g. from sensors, in a way that is statistically optimal. The numeric blending is effected via a set of Kalman gain factors which are derived from the evolving uncertainties in the estimated variables and the quality of the externally supplied measurements. The gains are time-varying and this statistically optimal blending process results in more accurate calculations of roll angle error and roll rate scale factor error under a wide range of operating conditions compared with previous systems which have used fixed gains.

In the present case the Kalman filter preferably includes a standard navigation error model components of which embody the relationship between the attitude and sensor errors such that the filter is capable of inferring roll angle and optionally also roll scale factor errors when heading/pitch errors develop.

The pseudo-measurements may take any suitable form that provides a constraint on the growth in pitch angle error and yaw angle error in the Kalman filter and that can be generated right from the initiation of the filter without waiting for sensors to come online. In one example, the at least one pseudo-measurement may comprise a pitch angle pseudo-measurement and a yaw angle pseudo-measurement, generated from stored expected pitch angle data and stored expected yaw angle data respectively. The stored data may be stored in a non-volatile memory which is programmed (loaded with the expected flight data) shortly before launch and before any pre-launch power down of the projectile's navigation system. These pseudo-measurements give the most direct way of constraining the growth in pitch and yaw angle error by providing pseudo-measurements to the Kalman filter of what these angles are expected to be at the present flight time (the expected data will typically be generated or looked up as a function of flight time). The filter will then combine these pseudo-measurements with the actual angles calculated from the gyro outputs (e.g. in an attitude integration unit) and with its internal model predictions to constrain the growth in the pitch and yaw angle errors.

Other pseudo-measurements may be used instead of direct Euler angle pseudo-measurements. For example, pseudo-measurements may be used that simulate (or mimic) the measurements that are obtained from a GPS sensor. Standard GPS sensors typically provide three dimensional position measurements and three dimensional velocity measurements (i.e. three position coordinates and three velocity components). Pseudo-measurements corresponding to at least some of these sensor outputs can be used to constrain the pitch and yaw angle error growth. For example, in some examples the at least one pseudo-measurement comprises a GPS position pseudo-measurement generated from stored expected position data. In other examples the at least one pseudo-measurement comprises a GPS velocity pseudo-measurement generated from stored expected velocity data. The position and/or velocity pseudo-measurements may be full three-dimensional position and/or three-dimensional velocity pseudo-measurements, but two-dimensional position and/or two-dimensional velocity pseudo-measurements will normally suffice to constrain the pitch angle and yaw angle error growth. For example, longitude and latitude position pseudo-measurements and/or North and East velocity components (it will be appreciated that these coordinate systems are used merely for illustrative purposes rather than being limiting on the types of coordinates that can be used). In such cases, the pseudo-measurements of position/velocity are compared with the live estimates of position/velocity output by the inertial navigation system. Thus, in the case of pseudo-measurements of position/velocity, the navigation system must be capable of outputting position/velocity estimates (i.e. it cannot simply be a gyroscopic based navigation system). Such systems typically use linear accelerometers in combination with the gyroscopes to produce such position and/or velocity estimates.

In another example the at least one pseudo-measurement comprises a velocity pseudo-measurement generated from a combination of measured platform speed with stored expected pitch angle and stored expected yaw angle. This is an alternative to simulating GPS velocity measurements and can instead use a measured platform speed (e.g. measured by one or more linear accelerometers) to provide an estimate of the current platform (projectile) speed. Alternatively the platform speed may also be obtained from expected speed/velocity data. The speed may be combined with the stored expected pitch angle and yaw angle to provide a velocity that has the right magnitude for the speed, but which has a direction corrected according to the expected angle data, thus constraining any growth in pitch and yaw angle error that results from roll angle error. These approaches exploit the effect described earlier in which the longitudinal drag force is mis-resolved leading to velocity errors.

A consequence of this approach is that state uncertainties calculated by the filter during the pseudo-measurement update phase may become falsely optimistic in respect of the position and velocity states. Later in the flight when more accurate measurements are available e.g. from a GPS system, the erroneous position and velocity uncertainties will lead the filter to preferentially propagate the existing estimates rather than correct them using the accurate measurements that are available. To address this problem, the controller of the inertial measurement system is preferably arranged to introduce system noise into the filter at the start of a second flight phase. The second flight phase may correspond to the acquisition of another positioning signal (such as GPS). The introduction of system noise into the filter at this point will increase the prevailing uncertainty values, allowing the filter to take proper account of the newly acquired positioning measurements and allowing rapid convergence. Preferably the noise is introduced as noise on the filter's velocity states. This elevated velocity uncertainty propagates through quite naturally to the position states and so there is no need to explicitly manipulate the position uncertainties. The system noise may be introduced for a fixed period of time after the start of the second flight phase to allow the filter to converge before the additional noise is cancelled and normal filter operation resumes.

Accordingly, where pseudo-measurements of this type are used, the controller is preferably further arranged to increase velocity uncertainty in the Kalman filter when a subsequent phase of projectile flight commences. The subsequent phase of flight may begin when a GPS signal (or other positioning signal) is acquired.

The controller may be arranged to increase velocity uncertainty for a predetermined period of time, e.g. for a certain period of time after the subsequent flight phase begins, sufficient to allow the filter to converge and/or establish viable uncertainty estimates. The controller may be arranged to increase velocity uncertainty by adding system noise to the Kalman filter. As discussed above, this noise need only be added to the velocity components of the Kalman filter.

In the case of stored expected angle (pitch, yaw) data, in the Kalman filter the difference between the pitch angle and the pitch angle pseudo-measurement is treated as a component of a Kalman filter innovation vector, and the difference between the yaw angle and the yaw angle pseudo-measurement is treated as another component of a Kalman filter innovation vector. In the case of stored expected position/velocity data, in the Kalman filter the difference between the live position estimate (from the inertial navigation system) and the position pseudo-measurement (and/or the difference between the live velocity estimate and the velocity pseudo-measurement) is treated as another component of a Kalman filter innovation vector. In a Kalman filter, new information enters the filter via the 'innovation' which is normally the difference between the current estimate of some variable and an independent measurement of the same variable. In the present case, an innovation vector is calculated using the current estimates of pitch angle and yaw angle from the inertial navigation system and the pseudo-pitch angle and pseudo-yaw angle taken from the expected trajectory. This pseudo-measurement update process keeps the filter stable during the early period of projectile flight. There may of course be multiple observations and multiple corresponding innovations within the Kalman filter, with the other innovations being calculated in the traditional manner.

The Kalman filter is preferably arranged to update its state vector by adding a product of its gain matrix and the innovation vector.

The pseudo-measurements are essentially manufactured measurements which are treated as real measurements by the Kalman filter. In other words they are treated as measurements from a sensor even though that sensor does not really exist. Because the pseudo-measurements of pitch angle and yaw angle only provide attitude information, estimates of the position and velocity variables may become quite inaccurate. This is not a problem as by far the most significant problem in the early stage of flight is keeping track of the roll angle accurately. Therefore this approach allows the other estimates to drift in exchange for a better tracking of the roll angle. The other filter state variables can then be corrected later in flight. In this implementation it is essential that the position and velocity uncertainties calculated by the filter during the Euler angle pseudo-measurement phase properly reflect the true uncertainties in these states. These uncertainties will arise due to various factors including, but not limited to, position initialisation error, velocity initialisation error due to variations in launch velocity and/or initial heading/pitch error, wind effects and inertial sensor errors of various types including biases, scale factor errors and misalignments. The reason that knowledge of these evolving uncertainties must be accurately estimated is that seamless switching to operation with GPS in a subsequent phase of flight will be crucially dependent on this; uncertainties that are too small will mean that the filter gains too little benefit from the new measurements, and uncertainties that are too large can lead to unpredictable filter behaviour. Accurate uncertainty estimates are achieved by optimal initialisation of the covariance matrix (P-matrix), and optimal configuration of the system noise matrix (Q-matrix). The skilled person will be familiar with the P-matrix and Q-matrix and the configurations thereof. It will be appreciated that this problem does not arise when pseudo-measurements of position/velocity are used as these constrain the position/velocity errors right from launch.

The model in the Kalman filter may be of varying degrees of complexity. For example it may just be designed to model the roll angle error and roll scale factor error or it may involve additional complexity such as estimating and correcting for crosswind effects. The model may take many different forms and may vary according to application. The model may involve the use of various filter state parameters from among: position, velocity, acceleration, roll rate, pitch rate, drag, meteorological conditions such as wind.

The Kalman filter preferably also receives measurements from the various on board sensors, particularly the first, second and third gyros and/or first, second and third linear accelerometers and optionally other sensors such as temperature and/or wind sensors, GPS sensors, etc. which may be used in generating the updated filter state.

In some examples the controller may be arranged to supply meteorological data to the filter as an initial condition for the Kalman filter. In this way the process can exploit prior knowledge of meteorological conditions when such data is available. This may be provided as an a priori estimate of crosswind velocity which is stored within the filter and the filter then estimates and corrects for the error in this a priori estimate.

The controller is preferably arranged to stop providing pseudo-measurements to the Kalman filter in a subsequent phase of flight. That subsequent phase of flight may begin when a GPS signal is acquired. Once GPS is acquired, the additional aiding data from the GPS will likely lead to a more accurate solution than can be found using the pseudo-measurements (which are after all not taken from real sensors). Thus, once the GPS lock has been acquired, the pseudo-measurement updates can be stopped, allowing the navigation system to continue operation based on real measurements from sensors. Additionally, no guidance manoeuvres will be attempted during the initial phase of flight prior to GPS signal acquisition. In later flight phases guidance may be initiated at which point the assumptions on which the pseudo-measurement updates are based (substantially fixed or predictable heading and known rate of elevation change) will no longer be valid.

In some preferred examples, the projectile is a longitudinal projectile and the spin axis is the longitudinal axis.

It will be appreciated that this disclosure relates to any platform where there is some spinning motion for at least part of the mission. It does not have to be spinning all the time. These platforms may be spin-stabilised (i.e. the spin is deliberately introduced to provide stability, such as is the case with artillery shells for example). Conversely, the spin may be incidental, for example introduced as a side effect of the way the rocket motor works. These latter platforms may have fins and can be more stable than artillery shells, but they still spin, albeit at lower rates.

In many applications the rotation rate of the platform may be variable (for example the roll rate may reduce during flight due to friction effects with air, as is the case for a projectile launched from a rifled barrel for instance) and the underlying roll gyro scale factor produces error effects which are correlated with the roll rate. The model in the Kalman filter preferably models such relationship.

The controller may be arranged to apply the roll angle correction to an attitude integration unit. The attitude integration unit computes the roll angle, pitch angle and yaw angle from the raw gyro outputs (which may be rate sensors). In addition, the controller may be arranged to calculate and apply a roll rate scale factor correction directly to the roll gyro output. This may be preferred over applying the scale factor correction to the attitude integration unit as it directly relates to the sensor and can thus correct the raw sensor data at source.

Preferably the roll gyro is a MEMS (Micro Electro Mechanical System) gyro. All three gyros may be MEMS gyros. In some examples, the roll gyro may be a MEMS gyro with a rate scale factor error of greater than 100 parts per million. In some examples, the rate scale factor error may be greater than 1000 parts per million. As the scale factor error can be corrected by the feedback system, a high scale factor error can be tolerated. Thus lower quality, less expensive components can be used, reducing the cost of the system while maintaining excellent accuracy. In particular these inexpensive gyros can be used with a Kalman filter for ultimately attaining improved processing and accuracy.

In some examples, the expected values for heading and elevation angles as a function of time may correspond to those expected from planar ballistic flight or near-planar ballistic flight. Planar ballistic flight refers to the trajectory that results when the only significant forces acting on the airframe are gravity and aerodynamic drag acting in the longitudinal axis. In general, there will always be other forces present. Some of these will either be small or will have a neutral deflection effect due to the rolling motion of the airframe. Others, such as the crosswind effects can be compensated by the Kalman filter in the subsequent stage of correction.

The ballistic flight trajectory is in some examples considered to be substantially in one plane and during such flight the heading angle (yaw angle) is not expected to change for the duration of that flight. At the same time, the elevation angle (pitch angle) is expected to decrease at a known rate throughout the flight as a spinning projectile (which is typically longitudinal) tends to orientate itself at a tangent to its trajectory. It may be noted that the rate of change of the pitch angle varies throughout the flight in a predictable manner which can readily be taken into account. It should also be noted that this flight may be one phase of a more complex flight plan, with subsequent phases involving corrective manoeuvres that deviate from the planar trajectory.

For many platforms the assumption that launch heading and launch elevation angle propagate as for ballistic flight is valid, but for other projectiles (for example guided rockets) an improvement can be made by adapting this idea a little as follows. During rocket motor burn, the platform is accelerating significantly, and it also undergoes some degree of weaving motion—for a few seconds, the heading and elevation angles change from their initialised (i.e. launch) values in an unpredictable fashion. Following rocket motor burn-out the projectile settles into a ballistic trajectory where the assumptions set out above are once again valid. The rocket motor burn is typically a few seconds in duration. During this time the heading and elevation angles that are initialised pre-launch may be propagated free-inertially by the strap-down algorithms (i.e. assuming that no changes occur during this short period). The burn phase is sufficiently short that significant heading and elevation angle errors do not arise during this time, so an acceptable approach on such platforms is to define a burn time (a predetermined time) and record the prevailing heading and elevation angles output by the navigation system at the end of this period. These angles become the reference values for subsequent pseudo-measurement generation. These updated reference values will be more accurate than the launch values as they will take into account any deviations from launch trajectory that have occurred during the motor burn phase.

The heading pseudo-measurement can be taken as a fixed value equal to the heading reference captured at rocket motor burn-out—it can then be assumed that the true heading of the platform is fixed at this value during subsequent ballistic flight. There may applications where the 'fixed heading' assumption is not valid, where the heading varies in a known way as a function of flight time for example. The same general approach to pseudo-measurement generation would still be used in these cases, but the navigation system would be loaded with a priori knowledge of the expected heading v flight time relationship as discussed above. Tabular data or an analytic expression can both be envisaged.

Generating an elevation angle pseudo-measurement is also straightforward but requires some explanation of the background. In ballistic flight the platform undergoes turning motion in the forward (downrange) axis—for example, a projectile may be launched at an elevation angle of 45° and fall to earth with an elevation angle of −45°, thus turning 90° during the course of the flight. This is sometimes referred to as the 'gravity turn rate' and it varies according to elevation angle and platform speed, reaching a maximum at apogee. For a simple point mass ballistic trajectory the following relationship may be derived;

$$\text{gravity turn rate} = -g \cdot \frac{\cos(\text{elevation angle})}{\text{platform speed}} \quad (1)$$

In the guided rocket case discussed above, the elevation angle pseudo-measurement for the subsequent ballistic flight phase may be generated by propagating the reference angle recorded at rocket motor burn-out and using the calculated gravity turn rate to provide expected values of elevation angle as a function of time for use as the pseudo-measurement. Platform speed can be calculated using the inertial navigation velocity estimates, and the turn rate estimate can be updated in each measurement epoch.

Thus in some preferred examples, the expected trajectory is recalculated after an initial flight phase based on current estimated pitch and yaw angles from the inertial measurement system.

In the case of projectiles that do not follow a purely planar trajectory, but still follow a predictable trajectory, the predicted heading and elevation angles (or angle rates) throughout the flight can still be used as reference values. One such example would be a spin-stabilised artillery shell which spins at very high rate (greater than 100 revolutions per second), which results in many forces which act to deflect the course of the shell. Any deviation of heading and elevation angles (or angle rates) from the reference values can be taken to have resulted from errors in the roll angle calculation. In such cases, pre-computed flight trajectory information is loaded into the on-board navigation system. This may be in the form of a flight path aiding table (FPAT) or similar. For many projectiles/munitions, the likely flight trajectory from launch point to target is established during a pre-launch mission planning process. This process usually yields tabular data describing the expected position, velocity and attitude of the projectile as a function of flight time (the FPAT). This data may be transferred to the projectile and used during flight for various purposes related to navigation/guidance. The expected yaw and pitch values, position values or velocity values can be continuously looked up during the flight as required. Therefore the expected pitch angle and expected yaw angle as a function of time may be taken from pre-computed flight trajectory information which may be non-planar. Angle rates, if used, may be included in this information or calculated from it. Equally, expected position and/or expected velocity values as a function of time may be taken from this pre-computed flight trajectory information.

The process described here to correct the roll angle correction (and optionally also the roll axis gyro scale factor error) may be complementary to other systems and can be used in combination with them, or it can be used as a standalone system. The system may be used with either simple or complex systems, with the roll angle correction either being the sole feedback element or being complementary to other corrections and/or feedback mechanisms.

In some examples, the roll angle correction (and optionally roll scale factor correction) may only be applied prior to any guidance action being initiated.

According to another aspect, this disclosure provides a method of correcting roll angle in an inertial measurement system for a spinning projectile. The method includes: computing a current projectile attitude from the outputs of first, second and third gyros, the computed attitude comprising a roll angle, a pitch angle and a yaw angle; operating a Kalman filter that receives as inputs a plurality of measurements including at least the roll angle, pitch angle and yaw angle and that outputs at least a roll angle error; initialising the Kalman filter with a roll angle error uncertainty representative of a substantially unknown roll angle; generating at least one pseudo-measurement from stored expected flight data, the or each pseudo-measurement corresponding to an expected measurement input of the Kalman filter; providing said pseudo-measurement(s) to the corresponding measurement input of the Kalman filter; and applying the roll angle error from the Kalman filter as a correction to the roll angle. The Kalman filter is arranged to calculate the roll angle error as a function of the pseudo-measurement(s).

All of the preferred features described above in relation to the system are equally applicable to the corresponding methods. In preferred examples, the method and system are particularly applicable to high roll rate projectiles, i.e. projectiles intended to be imparted with a high roll rate during flight, e.g. greater than 5, greater than 10 or greater than 15 revolutions per second.

BRIEF DESCRIPTION OF DRAWINGS

One or more non-limiting examples will now be described, by way of example only, and with reference to the accompanying figures in which:

FIG. 1a shows a projectile in flight;

FIG. 1b illustrates the attitude of the projectile;

FIG. 1c illustrates different possible phases of a projectile flight;

DETAILED DESCRIPTION

Figure 2:
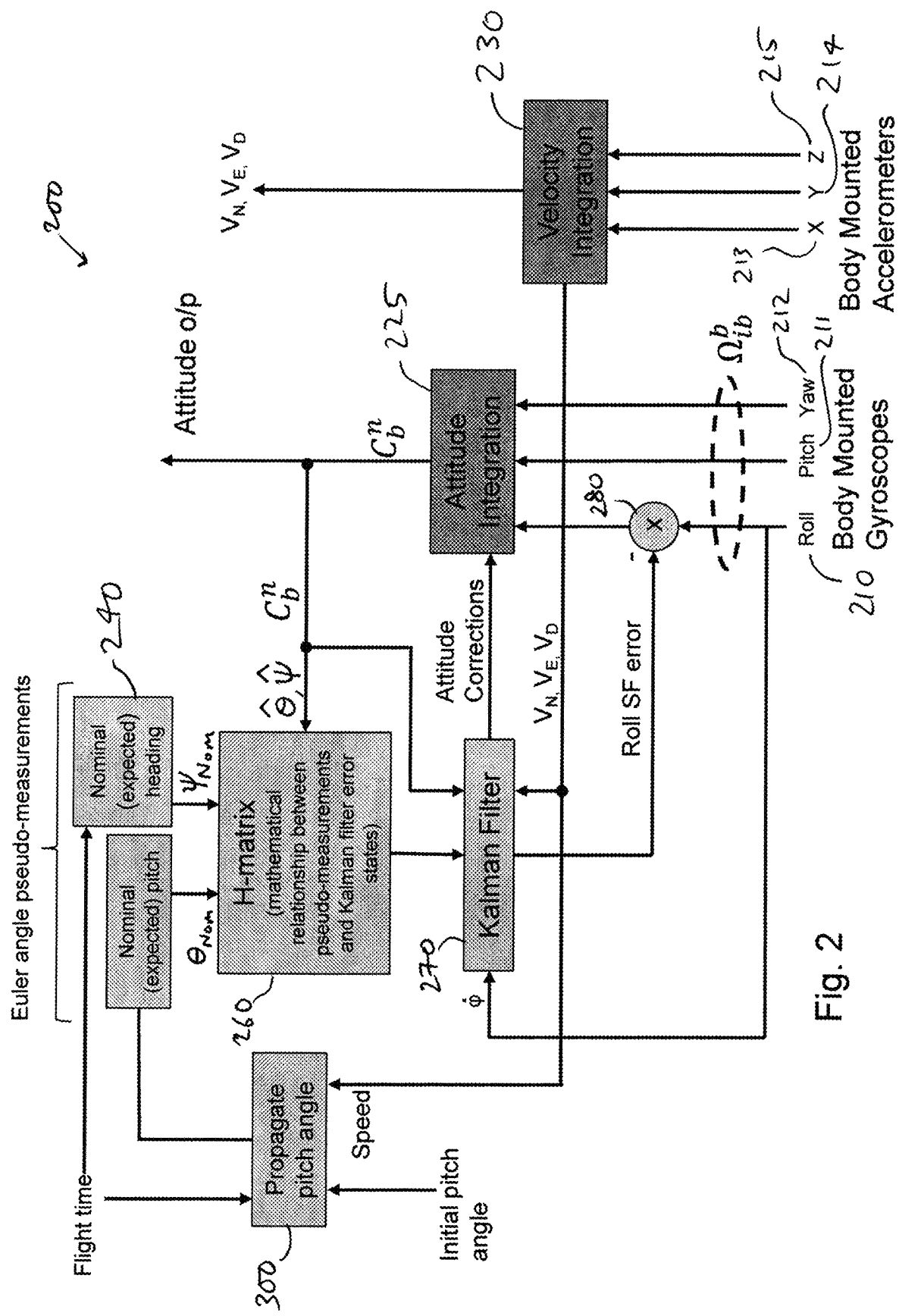
FIG. 2 shows an inertial navigation system with a roll control process.

The following describes a method to perform in-flight calibration of (i.e. to measure and correct) the roll axis rate gyro scale factor for an Inertial Measurement Unit (IMU) fitted to a rolling projectile 100.

FIG. 1a illustrates a rocket 100 in flight. Its trajectory 110 is shown in broken line. The rocket 100 has a nose 101, tail 102 with fins 103. Fins 103 may be static or they may be movable so as to provide directional control so as to alter the flight path of the rocket 100.

In inertial navigation terminology, the orientation of a body/platform is described in terms of the three Euler angles 'heading, 'elevation' and 'bank'. The equivalent terms 'yaw', 'pitch' and 'roll' are also in use and combinations of these terms may be used. For example it is common to refer to "roll, pitch and heading". The body orientation is generally referred to using the term 'attitude'. Although strictly speaking the term 'attitude' refers only to the elevation and bank angles, in this document, the more general definition is used. Therefore in this document, the term 'attitude' refers to all three of heading, elevation and bank (or equivalently yaw, pitch and roll).

In FIG. 1b the attitude 125 of the rocket 100 is shown with respect to the axes 120 of the navigation frame of reference. The projection of the attitude 125 onto the horizontal plane is shown by dotted line 126. The heading or yaw angle of the rocket is shown by the angle 121, the elevation or pitch angle of the rocket is shown by the angle 122 and the bank or roll angle of the rocket about its longitudinal axis is indicated by arrow 123. The rocket 100 is rotating anti-clockwise when viewed from behind as shown.

FIG. 1c illustrates the broad problem that is addressed by this disclosure. A spinning projectile 100 follows a trajectory 130 which may be divided into a ballistic phase 131 in which the projectile 100 is subject largely only to gravity and drag, and a guided flight phase 132 in which the projectile may be more actively directed for example using control fins to alter its flight for more accurate targeting. Such fins may be controlled by the on board computer based on the calculations of the navigation system.

The trajectory 130 can also be divided into a free inertial navigation phase 134 during which navigation is based solely on initial state information loaded into the projectile 100 pre-launch combined with inertial sensor readings from the on board gyros and accelerometers. GPS signal is not acquired until around the point indicated at 135 which may be around 20-25 seconds into flight for a typical munition for example. It is during this initial free inertial phase that it is most important to constrain the inertial navigation errors as otherwise the subsequent GPS-aided navigation phase will fail. With low-grade MEMS sensors, navigation errors (if not properly constrained) can accumulate to a large degree by this point. The roll axis gyro scale factor error is the main influence on these errors and therefore this is the most important error to constrain. After GPS acquisition at point 135 the projectile 100 enters the aided navigation phase 136 in which navigation is based on GPS aided by the on board sensors.

FIG. 2 indicates the overall architecture, involving the roll control processes of this example in conjunction with the normal Attitude Integration function 225 and velocity integration function 230 which exist with a standard strapdown inertial navigation function.

In more complex systems, the attitude integration function may also take into account other corrections such as Earth Rate Correction, Transport Rate Correction, Coriolis & Centripetal Correction and Gravity Correction. These corrections and the associated transformations between reference frames are all well-known and understood and will therefore not be described further here. However, to aid understanding, the symbols in FIG. 2 have the following meanings:

$C_b^n$ Transformation matrix—body to navigation reference frames
$\Omega_{ib}^b$ Body rotation rate in the body frame of reference
$\psi_{Nom}$ Nominal Heading angle
$\dot{\phi}$ Inertially measured roll rate
$V_N$ North component of inertially integrated velocity
$V_E$ East component of inertially integrated velocity
$V_D$ Down component of inertially integrated velocity
$\theta_{Nom}$ Nominal Elevation (pitch) angle
$\hat{\psi}$ Estimated Heading angle
$\hat{\theta}$ Estimated Elevation (pitch) angle
Speed Scalar Value Representing Overall Platform Speed The attitude angles output from the attitude integration module 225 are passed as inputs to the Kalman filter 270. Similarly, the velocity components $V_N$, $V_E$, $V_D$, output from the velocity integration module 230 are passed as inputs to the Kalman filter 270. The inertially measured roll rate $\dot{\phi}$ is also passed directly from the roll gyro 210 to the Kalman filter 270.

The Kalman filter 270 outputs a roll scale factor error that is directly applied as a correction to the roll gyro at 280. The Kalman filter 270 also outputs attitude corrections in the form of roll angle, pitch angle and yaw angle corrections to the attitude integration unit 225.

The integrated velocity components (i.e. the velocity vector), $V_N$, $V_E$, $V_D$, output from the velocity integration unit 230 are also passed to a pitch angle calculation unit 300. The pitch angle calculation unit 300 also takes initial pitch angle (i.e. initial launch angle) and flight time as inputs. The pitch angle calculation unit 300 can thus calculate an expected pitch angle on the basis of the expected turn rate of the projectile. For example, in the case of ballistic projectiles, the gravity turn rate is proportional to the current pitch angle and the current speed of the projectile. Thus, starting from the initial pitch angle and propagating this based on the time, the current turn rate and the current speed, an estimated pitch angle can be generated. It may be noted that the pitch angle profile for the trajectory could be pre-calculated entirely in advance, stored in a look-up table and simply read out according to flight time (and this may in fact give a more accurate pseudo-measurement of pitch angle). However, generating that pitch angle profile in advance can be time consuming, requiring additional information to be input during the mission-planning stage. Thus the pitch angle propagation based on current measured speed (according to the inertial navigation system) reduces the burden on the mission-planning exercise while still giving excellent results.

Within this unit 300, the projectile's estimated speed is calculated as the root sum squared of the velocity components (i.e. $\sqrt{V_N^2+V_E^2+V_D^2}$). In this example, three velocity components are present, $V_N$, $V_E$, $V_D$ (being the North, East and Down components), but as discussed above it will be appreciated that a single component or two components (typically $V_N$ and $V_E$, i.e. the horizontal components) may be used in some simplified systems.

As indicated at 240, a nominal heading is also provided. This may simply be a stored value programmed into the navigation system prior to launch representing the launch heading. This would be adequate for the case of a projectile that is expected to follow a primarily planar ballistic trajectory in the early phase of flight, i.e. its heading is not expected to change. In other cases where the heading may change in a known and predictable manner, the nominal heading provided at 240 may be provided as a function of flight time, e.g. from a look-up table or calculated from a known function programmed into the navigation system.

In box 260 the Euler angle pseudo-measurements and the Euler angle estimates from the inertial navigation system (specifically attitude integration unit 225) need to be manipulated mathematically so that they can be fed into the Kalman filter 270 as measurements and estimates of the Kalman filter error states. This manipulation is a series of transformations combined together into the "H-matrix" 260. Obtaining the correct matrix terms is an exercise in coordinate transformation; a transform is required that converts from the non-orthogonal Euler angle domain to the navigation tilt error domain. The overall transform is obtained using a combination of standard transforms which relate body axes, Euler angles and navigation axes. The latter will depend on how the user has formulated the integrated navigation Kalman filter. For some applications, typically those requiring higher accuracy, the navigation frame may be the local geographic frame i.e. a frame that is locally level/tangential to the earth at the current position (this is the frame which uses the notation 'north', 'east' and 'down' to describe the three axes). In some applications it may be appropriate to navigate in a local Cartesian frame with origin at the projectile launch location The contents of the H-matrix 260 and the raw pseudo-measurements $\theta_{Nom}$, $\psi_{Nom}$ are provided to the Kalman filter 270 for use in calculation of roll angle and roll scale factor error corrections.

Figure 3:
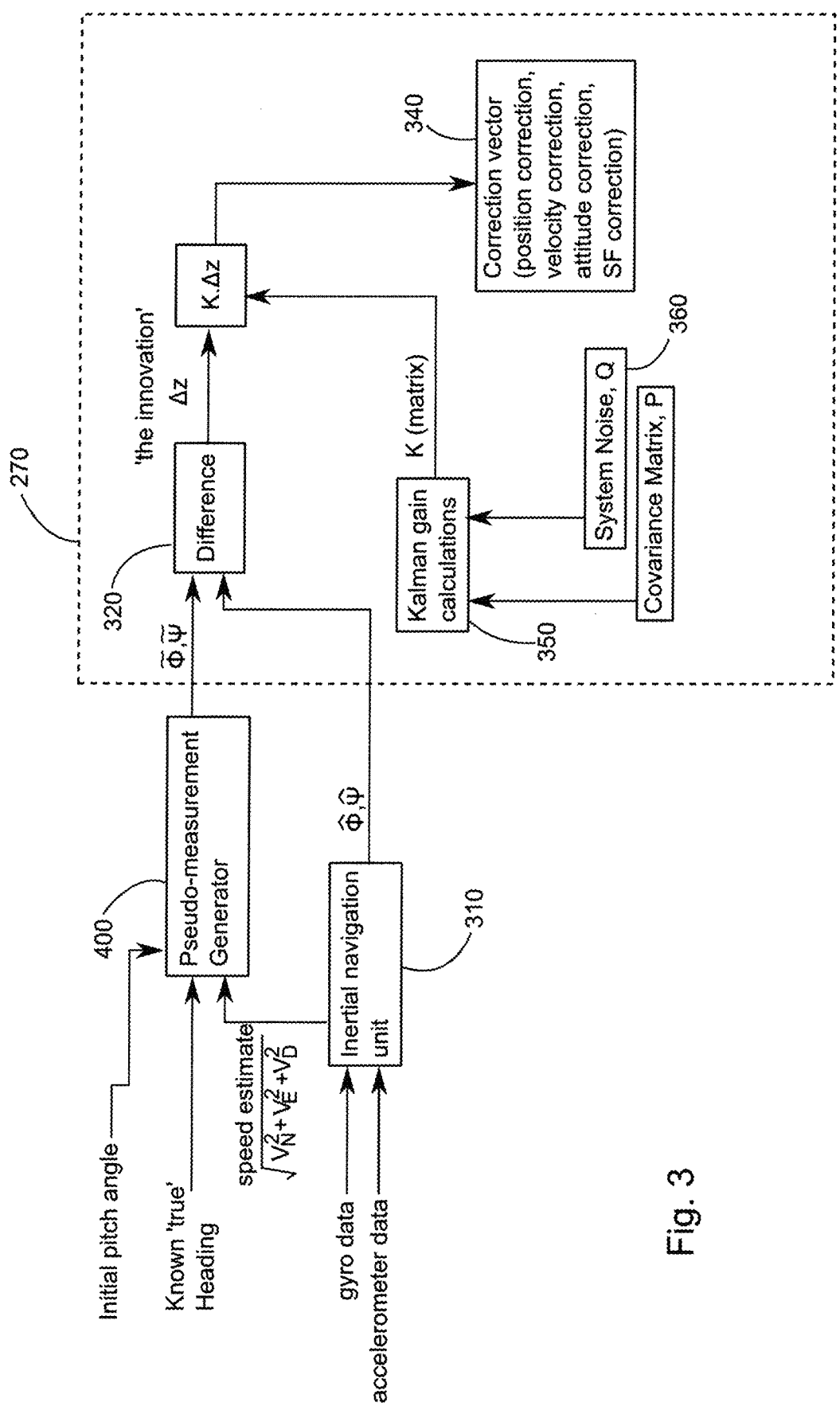
FIG. 3 schematically shows part of the Kalman filter operation for a pseudo-Euler angle measurement process.

Some aspects of the Kalman Filter 270 are illustrated in FIG. 3.

FIG. 3 shows the Inertial navigation unit 310 (encompassing velocity integration unit 230 and attitude integration unit 225) outputting its speed estimate to pseudo-measurement generator 400. The nominal heading is also provided to pseudo-measurement generator 400 in the same way as is illustrated by box 240 in FIG. 2.

In the Kalman filter 270, the pseudo-Euler-angle components $\tilde{\theta}$, $\tilde{\psi}$ and the inertial navigation velocity components $\hat{\theta}$, $\hat{\psi}$ are provided to Difference calculator 320. Difference calculator 320 subtracts the pseudo-Euler angle components $\tilde{\theta}$, $\tilde{\psi}$ from the respective Euler angle estimate components $\hat{\theta}$, $\hat{\psi}$ from the inertial navigation unit 310, outputting vector $\Delta Z$. $\Delta Z$ is treated by the Kalman filter 270 as the 'innovation', i.e. the residual error measurement. The Kalman filter state is then updated by adding a correction vector 340 which is calculated by multiplying the 'innovation' $\Delta Z$ by the Kalman gain matrix K, calculated at 350.

The other aspects of the Kalman filter operation are standard and are therefore not described here.

In normal Kalman filter operation the 'innovation' is calculated as the difference between the current estimate of a variable and an independent measurement of the same variable provided by a sensor or other measurement source. Therefore in this example, the pseudo-Euler angle measurements $\tilde{\theta}$, $\tilde{\psi}$ are taken as an independent source of Euler angle measurement. Applying the pseudo-Euler angle measurement updates in the early flight phase when no other aiding sensor measurements are available constrains the growth of attitude errors within the system. It should be appreciated that in the later phase of flight when GPS measurements may be available the Euler angle pseudo-measurement process would be suspended and integrated navigation would continue with conventional GPS measurement updates in their place.

During the pseudo-Euler angle measurement update phase and prior to GPS acquisition, the pseudo-Euler angle updates serve to restrict the growth of attitude errors by constantly estimating and correcting errors in the roll gyro scale factor estimate and by making direct corrections to the attitude angles. In the filter 270, position and velocity correction processes will also be active at this time but any such corrections will not be accurate as the Euler angle pseudo-measurements provide no observability of the position or velocity error. Correct initialisation of the P-matrix and correct configuration of the system noise matrix 360 ensure that position and velocity uncertainties propagate accurately during the pseudo-measurement phase. This facilitates seamless transition to GPS measurement updates in a subsequent flight phase.

In the particular case where pseudo-velocity measurements derived from speed and expected heading/pitch are used, the filter will be poorly conditioned at the point in time at which GPS is acquired and accurate position and velocity updates become available. In this particular implementation, the difference between current position and velocity estimates within the filter 270 and the GPS-supplied updates could be large and will generally by significantly larger than the prevailing uncertainty levels calculated by the filter 270. It is desirable to avoid this situation and a solution is to manipulate position and velocity state uncertainties in the filter 270 at the point of GPS acquisition. A technique called Q-boosting can be used. The Q matrix (or 'system noise matrix') is the mechanism for introducing uncertainty into the way the various system states propagate over time. Having non-zero values in the Q-matrix recognises that, although the filter 270 has a model of the propagation characteristics, the model is not perfect and some 'fuzziness' is required. One way to address this is: at the point of GPS acquisition and for some fixed period thereafter, the system noise added to the velocity states can be artificially elevated, e.g. using a multiplicative factor. This elevated velocity uncertainty propagates quite naturally to the position states so there is no need to explicitly manipulate the position uncertainties. When a trigger occurs (e.g. a predetermined period of time or a GPS acquisition signal), a Q booster injects noise into the system noise matrix 360 (specifically onto the velocity elements of system noise matrix 360) for a limited period of time.

Figure 4:
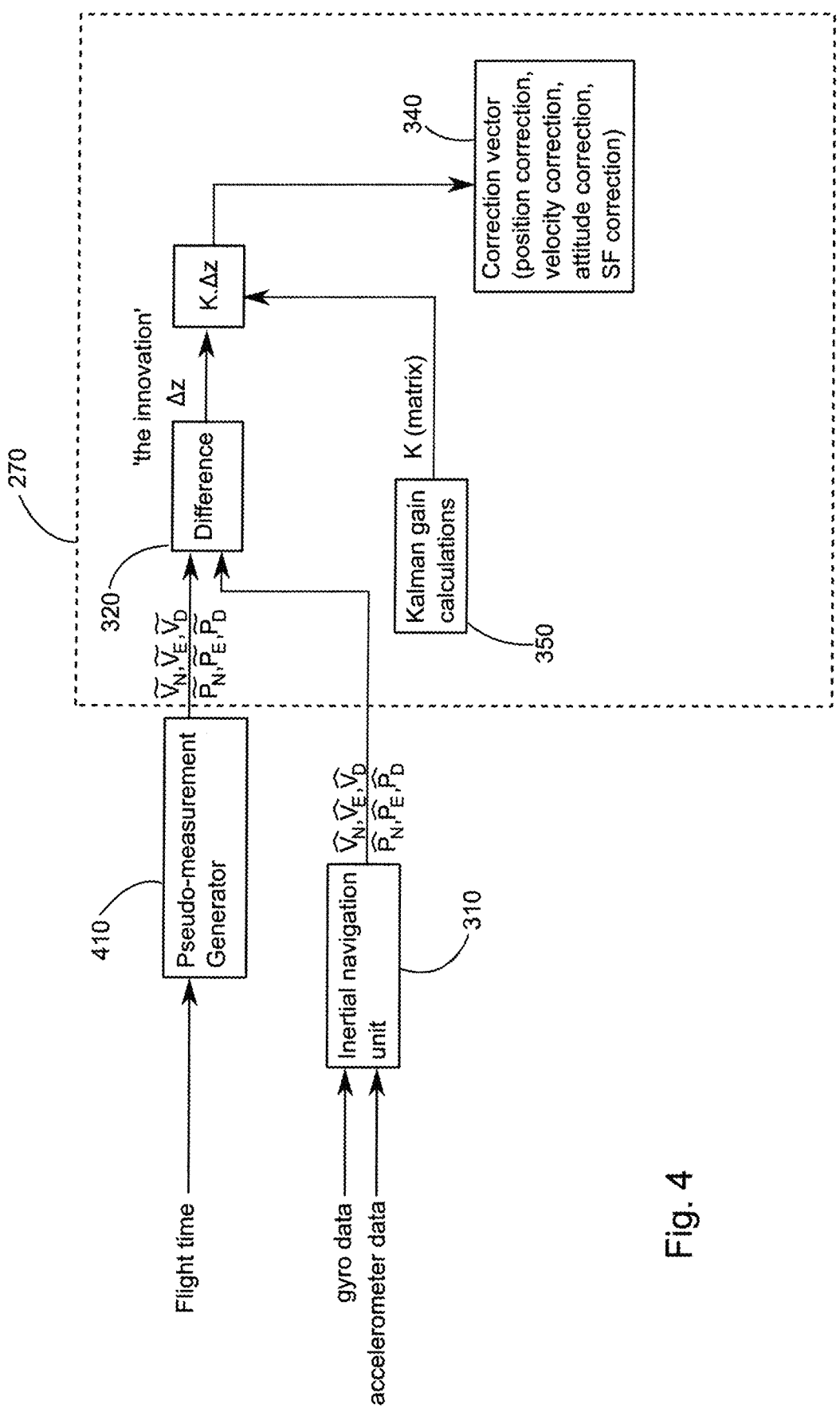
FIG. 4 schematically shows part of the Kalman filter operation for a pseudo-position and pseudo-velocity measurement process.

FIG. 4 is similar to FIG. 3, but illustrates the use of pseudo-position and pseudo-velocity measurements instead of pseudo-Euler angle measurements. While FIG. 4 shows both position and velocity being used together, it will be appreciated that the illustrated system may be readily be adjusted to operate with only position or with only velocity components.

FIG. 4 shows the Inertial navigation unit 310 (encompassing velocity integration unit 230 and attitude integration unit 225) outputting its nominal position and velocity values $\hat{P}_N$, $\hat{P}_E$, $\hat{P}_D$, $\hat{V}_N$, $\hat{V}_E$, $\hat{V}_D$ (these being live estimates produced from the outputs of the linear accelerometers and gyroscopes). There is no need for the speed estimate or nominal heading to be output as in FIG. 3.

In the Kalman filter 270, the pseudo-position and velocity components $\tilde{P}_N$, $\tilde{P}_E$, $\tilde{P}_D$, $\tilde{V}_N$, $\tilde{V}_E$, $\tilde{V}_D$ (which are generated by Flight Path Aiding table 410 based on the flight time) and the inertial navigation velocity components $\hat{P}_N$, $\hat{P}_E$, $\hat{P}_D$, $\hat{V}_N$, $\hat{V}_E$, $\hat{V}_D$ are provided to Difference calculator 320. Difference calculator 320 subtracts the pseudo-position and velocity components $\tilde{P}_N$, $\tilde{P}_E$, $\tilde{P}_D$, $\tilde{V}_N$, $\tilde{V}_E$, $\tilde{V}_D$ from the respective Euler angle estimate components $\hat{P}_N$, $\hat{P}_E$, $\hat{P}_D$, $\hat{V}_N$, $\hat{V}_E$, $\hat{V}_D$ from the inertial navigation unit 310, outputting vector $\Delta Z$. $\Delta Z$ is treated by the Kalman filter 270 as the 'innovation', i.e. the residual error measurement. The Kalman filter state is then updated by adding a correction vector 340 which is calculated by multiplying the 'innovation' $\Delta Z$ by the Kalman gain matrix K, calculated at 350.

The flight path aiding table 410 is prepared during a mission planning process using knowledge of the projectile (e.g. its aerodynamic properties), meteorology, etc. and is loaded onto the projectile (stored in a non-volatile memory).

The invention claimed is:

1. An inertial measurement system for a spinning projectile comprising:
   a first, roll gyro with an axis oriented substantially parallel to the spin axis of the projectile;
   a second gyro and a third gyro with axes arranged with respect to the roll gyro such that they define a three dimensional coordinate system;
   a controller, arranged to:
      compute a current projectile attitude from the outputs of the first, second and third gyros, the computed attitude comprising a roll angle, a pitch angle and a yaw angle;

operate a Kalman filter that receives a plurality of measurement inputs including at least the roll angle, pitch angle and yaw angle and that outputs at least a roll angle error;

initialise the Kalman filter with a roll angle error uncertainty representative of a substantially unknown roll angle;

generate at least one pseudo-measurement from stored expected flight data, the or each pseudo-measurement corresponding to an expected measurement input of the Kalman filter;

provide said pseudo-measurement(s) to the corresponding measurement input of the Kalman filter; and apply the roll angle error from the Kalman filter as a correction to the roll angle;

wherein the Kalman filter is arranged to calculate the roll angle error as a function of the pseudo-measurement(s).

2. An inertial measurement system as claimed in claim 1, wherein the spinning projectile is arranged to be powered off at launch and to power up after launch.

3. An inertial measurement system as claimed in claim 1, wherein the roll angle uncertainty is initialised as at least 90 degrees, preferably at least 135 degrees, more preferably at least 160 degrees, and most preferably 180 degrees.

4. An inertial measurement system as claimed in claim 1, wherein the at least one pseudo-measurement comprises a pitch angle pseudo-measurement and a yaw angle pseudo-measurement generated from stored expected pitch angle data and stored expected yaw angle data respectively.

5. An inertial measurement system as claimed in claim 1, wherein the at least one pseudo-measurement comprises a GPS position pseudo-measurement generated from stored expected position data.

6. An inertial measurement system as claimed in claim 1, wherein the at least one pseudo-measurement comprises a GPS velocity pseudo-measurement generated from stored expected velocity data.

7. An inertial measurement system as claimed in claim 1, wherein the at least one pseudo-measurement comprises a velocity pseudo-measurement generated from a combination of measured platform speed with stored expected pitch angle and stored expected yaw angle.

8. An inertial measurement system as claimed in claim 4, wherein the difference between the pitch angle and the pitch angle pseudo-measurement is treated as a component of a Kalman filter innovation vector, and wherein the difference between the yaw angle and the yaw angle pseudo-measurement is treated as another component of a Kalman filter innovation vector.

9. An inertial measurement system as claimed in claim 1, wherein the controller is arranged to stop providing pseudo-measurements to the Kalman filter in a subsequent phase of flight.

10. An inertial measurement system as claimed in claim 1, wherein the controller is arranged to apply the roll angle correction to an attitude integration unit.

11. An inertial measurement system as claimed in claim 1, wherein the controller is arranged to calculate and apply a roll rate scale factor correction directly to the roll gyro output.

12. An inertial measurement system as claimed in claim 1, wherein the expected trajectory is planar ballistic flight or near-planar ballistic flight.

13. An inertial measurement system as claimed in claim 4, wherein the expected pitch angle and expected yaw angle or the expected position data or the expected velocity data as a function of flight time are taken from a pre-computed flight trajectory which may be non-planar.

14. An inertial measurement system as claimed in claim 1, wherein the expected trajectory is recalculated after an initial flight phase based on current estimated pitch and yaw angles from the inertial measurement system.

15. A method of correcting roll angle in an inertial measurement system for a spinning projectile, comprising:

computing a current projectile attitude from the outputs of first, second and third gyros, the computed attitude comprising a roll angle, a pitch angle and a yaw angle;

operating a Kalman filter that receives as inputs a plurality of measurements including at least the roll angle, pitch angle and yaw angle and that outputs at least a roll angle error;

initialising the Kalman filter with a roll angle error uncertainty representative of a substantially unknown roll angle;

generating at least one pseudo-measurement from stored expected flight data, the or each pseudo-measurement corresponding to an expected measurement input of the Kalman filter;

providing said pseudo-measurement(s) to the corresponding measurement input of the Kalman filter; and applying the roll angle error from the Kalman filter as a correction to the roll angle;

wherein the Kalman filter is arranged to calculate the roll angle error as a function of the pseudo-measurement(s).

* * * * *